US010252579B2

(12) United States Patent
Numata

(10) Patent No.: US 10,252,579 B2
(45) Date of Patent: Apr. 9, 2019

(54) HEAVY DUTY TIRE

(71) Applicant: SUMITOMO RUBBER INDUSTRIES, LTD., Kobe-shi, Hyogo (JP)

(72) Inventor: Kazuki Numata, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 256 days.

(21) Appl. No.: 15/038,522

(22) PCT Filed: Nov. 4, 2014

(86) PCT No.: PCT/JP2014/079235
§ 371 (c)(1),
(2) Date: May 23, 2016

(87) PCT Pub. No.: WO2015/083474
PCT Pub. Date: Jun. 11, 2015

(65) Prior Publication Data
US 2016/0297254 A1 Oct. 13, 2016

(30) Foreign Application Priority Data

Dec. 6, 2013 (JP) .................................. 2013-253518

(51) Int. Cl.
*B60C 11/12* (2006.01)
*B60C 11/03* (2006.01)
*B60C 11/13* (2006.01)

(52) U.S. Cl.
CPC ........ *B60C 11/1236* (2013.01); *B60C 11/033* (2013.01); *B60C 11/0306* (2013.01);
(Continued)

(58) Field of Classification Search
CPC ............. B60C 11/0302; B60C 11/0306; B60C 11/033; B60C 11/0332; B60C 11/12;
(Continued)

(56) References Cited

U.S. PATENT DOCUMENTS 4,299,264 A * 11/1981 Williams ............ B60C 11/0302
152/209.18
4,905,748 A 3/1990 Kukimoto et al.
(Continued)

FOREIGN PATENT DOCUMENTS

EP 0688686 A2 12/1995
EP 2202096 A2 6/2010
(Continued)

OTHER PUBLICATIONS

Naoya Ochi, JP 08216623, machine translation. (Year: 1995).*
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

A heavy duty tire includes, in a tread portion, circumferentially extending zigzag center main grooves, circumferentially extending linear shoulder main grooves, a center land portion, middle land portions, and shoulder land portions. The middle land portions have middle inclined grooves connecting an axially outer top portion of one of the center main grooves and its adjacent shoulder main groove. The shoulder land portions have shoulder inclined grooves connecting one of the shoulder main grooves and its adjacent tread grounding end. The center land portion has first center inclined sipes connecting an axially inner top portion of one of the center main grooves and its adjacent axially inner top portion of the other center main groove and second center (Continued)

inclined sipes connecting an axially outer top portion of one of the center main grooves and its adjacent axially outer top portion of the other center main groove.

10 Claims, 6 Drawing Sheets

(52) U.S. Cl.
CPC ...... B60C 11/0332 (2013.01); B60C 11/1376 (2013.01); *B60C 2011/0334* (2013.01); *B60C 2011/0346* (2013.01); *B60C 2011/0353* (2013.01); *B60C 2011/0365* (2013.01); *B60C 2011/1209* (2013.01); *B60C 2200/06* (2013.01); *Y02T 10/862* (2013.01)

(58) Field of Classification Search
CPC ............... B60C 11/1236; B60C 11/124; B60C 11/1376; B60C 11/1384; B60C 11/1392; B60C 2011/0334; B60C 2011/0346; B60C 2011/0353; B60C 2011/0358; B60C 2011/0365; B60C 2011/1209; B60C 2011/1254; B60C 2200/06; Y02T 10/862
USPC .................................................... 152/209.18
See application file for complete search history.

(56) References Cited

U.S. PATENT DOCUMENTS

| 5,830,294 | A | * | 11/1998 | Shibata | ............... | B60C 11/0083 |
| | | | | | | 152/209.1 |
| 2003/0102064 | A1 | | 6/2003 | Below | | |
| 2011/0226397 | A1 | * | 9/2011 | Hamada | ................. | B60C 11/11 |
| | | | | | | 152/209.18 |
| 2013/0240103 | A1 | | 9/2013 | Maehara | | |
| 2017/0225515 | A1 | * | 8/2017 | Hayashi | ................. | B60C 11/12 |

FOREIGN PATENT DOCUMENTS

| JP | 62-103205 | A | | 5/1987 | | |
| JP | 6-143941 | A | | 5/1994 | | |
| JP | 8-216623 | A | | 8/1996 | | |
| JP | 11-34614 | A | | 2/1999 | | |
| JP | 2002029222 | A | * | 1/2002 | ......... | B60C 11/1384 |
| JP | 2004-520990 | A | | 7/2004 | | |
| JP | 2007-69692 | A | | 3/2007 | | |
| JP | 2010-149599 | A | | 7/2010 | | |
| JP | 2012-20714 | A | | 2/2012 | | |
| JP | 4888170 | B2 | * | 2/2012 | | |
| JP | 2012-111438 | A | | 6/2012 | | |
| JP | 2013-193463 | A | | 9/2013 | | |

OTHER PUBLICATIONS

Taisuke Sakaguchi, JP 4888170, machine translation. (Year: 2008).*
Atsushi Gojo, JP 2007069692, machine translation. (Year: 2007).*
Koyo Kiwaki, JP 2002029222, machine translation. (Year: 2002).*
Takashi Haga, JP 2012020714, machine translation. (Year: 2012).*
Extended European Search Report, dated Jul. 13, 2017, for European Application No. 14867752.9.
International Search Report, issued in PCT/JP2014/079235, PCT/ISA/210, dated Feb. 3, 2015.
Written Opinion of the International Searching Authority, issued in PCT/JP2014/079235, PCT/ISA/237, dated Feb. 3, 2015.

\* cited by examiner

HEAVY DUTY TIRE

TECHNICAL FIELD

The present invention relates to a heavy duty tire satisfying both of rolling resistance performance and wet performance at a high level.

BACKGROUND ART

In the heavy duty tire which is used like a truck and a bus, the high wet performance is required. For example, the following Patent Document 1 proposes a tire is provided in a center land portion, a middle land portion and a shoulder land portion of a tread portion are provided with a number of lateral grooves, thereby increasing a groove volume and enhancing the wet performance.

PRIOR ART DOCUMENTS

Patent Literature

Patent Document 1: Japanese published unexamined application No. H11-034614

However, in the heavy duty tire disclosed in the above-mentioned Patent Document 1, with the increase of the groove volume, the rigidity of the tread portion decreases, and the rolling resistance and abrasion resistance performance are deteriorated. For increasing the wear resistance performance, a method to increase the rubber volume of the tread portion is valid, but the increase in the rubber volume leads to further deterioration of the rolling resistance performance.

SUMMARY OF THE INVENTION

Problems that the Invention is to Solve

The present invention has been therefore devised in view of the circumstances described above, and has a main purpose to provide a heavy duty tire satisfying both of the rolling resistance performance and the wet performance at a high level.

Means for Solving the Problems

The present invention relates to a heavy duty tire comprising, in a tread portion, a pair of center main grooves disposed on both outer sides of the tire equator and extending continuously in a zigzag shape in the tire circumferential direction, and a pair of the shoulder main grooves disposed on the axially outer sides of the center main groove and extending continuously linearly in the tire circumferential direction, and thereby dividing the tread portion into a center land portion between the pair of center main grooves, a pair of middle land portion each disposed between the center main groove and the shoulder main groove, and a pair of shoulder land portion each disposed axially outside of the respective shoulder main groove. A groove width Ws of each of the shoulder main grooves is larger than the groove width Wc of each of the center main grooves. Each of the middle land portions is provided with a plurality of middle inclined grooves extending at an angle with respect to the tire axial direction and each communicating between an axially outer top portion of the center main groove and the shoulder main groove. Each of the shoulder land portions is provided with a plurality of shoulder inclined grooves extending at an angle with respect to the tire axial direction and each communicating between the shoulder main groove and the tread grounding end. A groove width of the shoulder inclined groove is larger than a groove width of the middle inclined groove. The center land portion comprises a first center inclined sipe extending at an angle with respect to the tire axial direction and communicating between axially inner top portions of the center main groove to each other, and a second center inclined sipe extending at the same direction as the first center inclined sipe and communicating between axially outer top portions of the center main groove to each other.

In the heavy duty tire according to the present invention, the middle inclined groove on a first side of the tire equator is inclined in the opposite direction to the middle inclined groove of a second side of the tire equator.

In the heavy duty tire according to the present invention, the shoulder inclined groove on the first side of the tire equator is inclined in the opposite direction to the shoulder inclined groove of the second side of the tire equator.

In the heavy duty tire according to the present invention, each angle of the first center inclined sipe and the second center inclined sipe with respect to the tire axial direction is larger than angles of the middle inclined groove and the shoulder inclined groove with respect to the tire axial direction.

In the heavy duty tire according to the present invention, between the circumferentially adjacent middle inclined grooves, a middle inclined sipe extending parallel to the middle inclined grooves is formed, and between the circumferentially adjacent shoulder inclined grooves, a shoulder inclined sipe extending parallel to the shoulder inclined grooves is formed.

In the heavy-duty tire according to the present invention, the middle inclined sipes is communicated between the center main groove and the shoulder main groove, the middle land portion is provided on a first corner portion sandwiched between the middle inclined sipe and the center main groove with a first chamfered portion descending toward the center main groove, and is provided on a second corner portion sandwiched between the middle inclined sipe and the shoulder main groove with a second chamfered portion descending toward the shoulder main groove.

In the heavy duty tire according to the present invention, the first center inclined sipe is formed to be continuous with the middle inclined sipe via the center main groove.

In the heavy duty tire according to the present invention, a land ratio of the tread portion is not less than 80%.

In the heavy duty tire according to the present invention, a ratio Ws/Wc between the groove width Ws of the shoulder main groove and the groove width Wc of the center main groove is from 1.5 to 2.0.

In the heavy duty tire according to the present invention, the center main groove has an angle of from 10 to 15 degrees with respect to the tire circumferential direction.

In the heavy-duty tire according to the present invention, a ratio Ls/Lc between a ground contact length Ls of a groove edge of the shoulder main groove of the shoulder land portion and a ground contact length Lc in the tire equator is from 0.9 to 1.0.

Effect of the Invention

In the heavy duty tire of the present invention, the shoulder main groove is formed linearly in the tire circumferential direction, and the groove width Ws of the shoulder main groove is larger than the groove width Wc of the center main groove. This shoulder main groove enhances drainage performance of the tread portion, thereby improving the wet performance. Further, since the middle land portion and the shoulder land portion are provided with the middle inclined groove and the shoulder inclined groove inclined with respect to the tire axial direction, the drainage from the middle land portion to the tread grounding end is promoted, and the wet performance is more improved.

On the other hand, since the first center inclined sipe and the second center inclined sipe provided in the center land portion are closed at a time of grounding, the adjacent sipe side walls attach firmly and support each other, thereby improving the rigidity of the tread portion. Accordingly, deformation of the center land portion having high ground pressure is suppressed, thereby improving rolling resistance performance.

DESCRIPTION OF THE INVENTION

Hereinafter, an embodiment of the present invention will be described with reference to the accompanying drawings.

Figure 1:
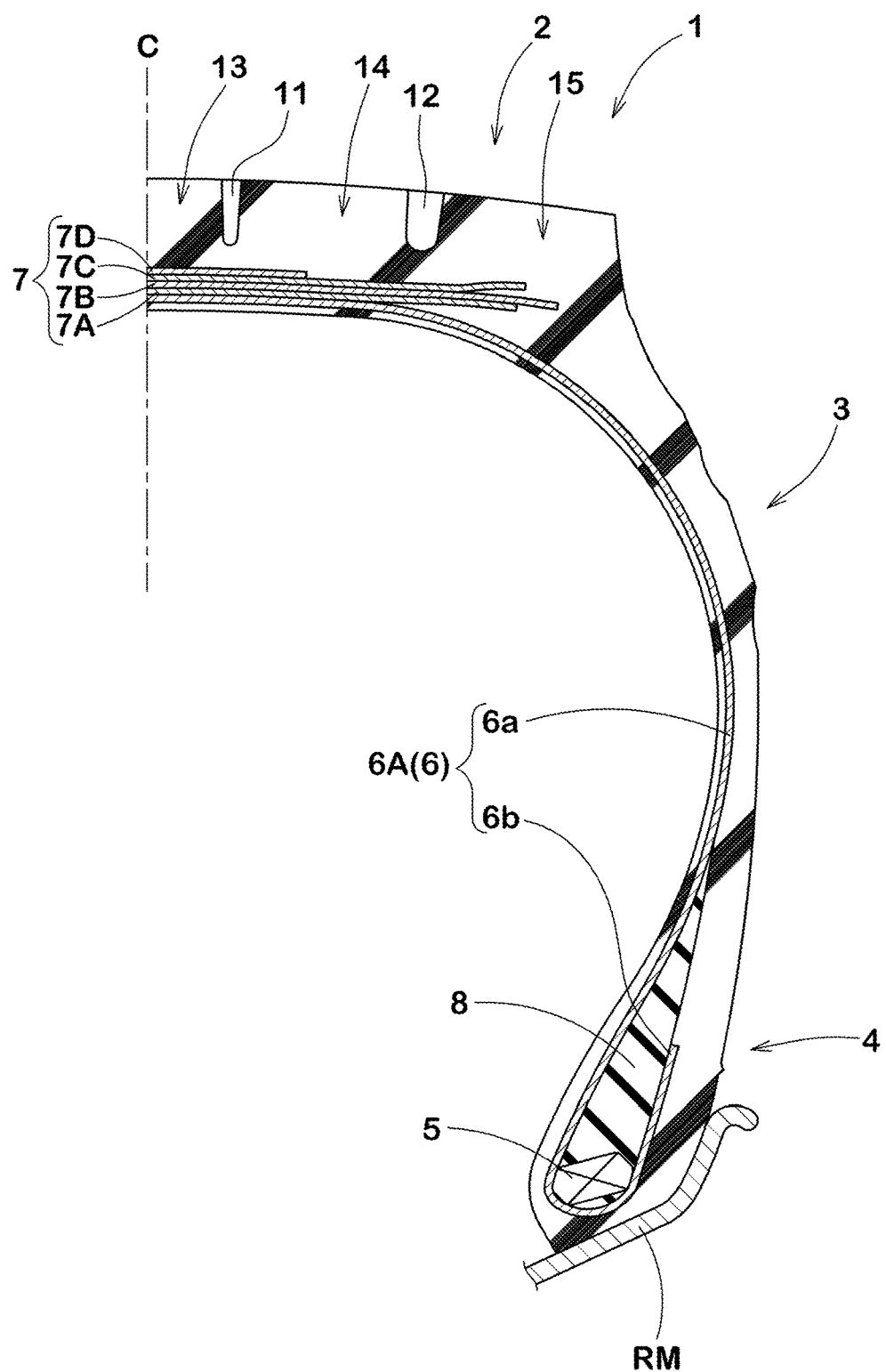
FIG. 1 is a cross-sectional view showing an embodiment of a heavy duty tire of the present invention.

FIG. 1 is a cross-sectional view on the tire meridian section including the tire axis at standard state of a heavy duty tire 1 of the present invention. Here, the "standard state" means a state of a tire filled with standard internal pressure with no-load is assembled on a standard rim (not shown). Hereinafter, if not specifically mentioned, dimensions and the like of each part of the tire are values measured in the standard state.

The "normal rim" is a rim determined for each tire by a standard including one on which the tire is based. For example, it is a standard rim in the case of JATMA, a "Design Rim" in the case of TRA, and a "Measuring Rim" in the case of ETRTO.

The "normal internal pressure" means an air pressure determined for each tire by the standard. For example, it is the maximum air pressure in JATMA, the maximum value described in a table "TIRE LOAD LIMITS AT VARIOUS COLD INFLATION PRESSURES" in the case of TRA, and the "INFLATION PRESSURE" in the case of ETRTO.

As shown in FIG. 1, the heavy duty tire 1 of the present invention comprises a toroidal carcass 6 extending from a tread portion 2 through a sidewall portion 3 to a bead core 5 of a bead portion 4, and a belt layer 7 or the like disposed radially outward of the carcass 6 and inward of the tread portion 2. This embodiment shows a case that the heavy duty tire 1 is a tubeless tire mounted on a 15 degrees taper rim RM.

The carcass 6 is composed of a carcass ply 6A having an array of carcass cord at an angle of from 80 to 90 degrees, for example, with respect to the tire equator C. The carcass ply 6A is provided on both ends of the ply main portion 6a between the bead cores 5 and 5 with a ply turnup portion 6b turned up from inside to outside in the tire axial direction around each of the bead cores 5. Between the ply main portion 6a and the ply turnup portion 6b, there is a bead apex rubber 8 having a triangular cross-section extending radially outward from the bead core 5.

The belt layer 7 is disposed radially outside of the carcass 6 and inside the tread portion 2. The belt layer 7 is formed of a plurality of belt plies with the use of a steel belt cord. The belt layer 7 of the present embodiment has four layers: an innermost belt ply 7A, and belt plies 7B, 7C and 7D successively disposed outside of the belt ply 7A. In the inner belt ply 7A, a belt cord is arranged at an angle of about from 60±10 degrees, for example, with respect to the tire equator C. In the belt plies 7B, 7C and 7D, belt cords are arranged at a small angle of about from 15 to 35 degrees with respect to the tire equator C. The belt layers 7 comprises at least one cross over point where the belt cords intersect each other between the plies, thereby increasing the belt rigidity and firmly reinforcing an approximately entire width of the tread portion 2.

The bead core 5 has a flat oblong hexagonal in cross-section, and the radially inner surface is inclined at an angle of from 12 to 18 degrees with respect to the tire axial direction, therefore a fitting force with the rim RM is widely increased.

Figure 2:
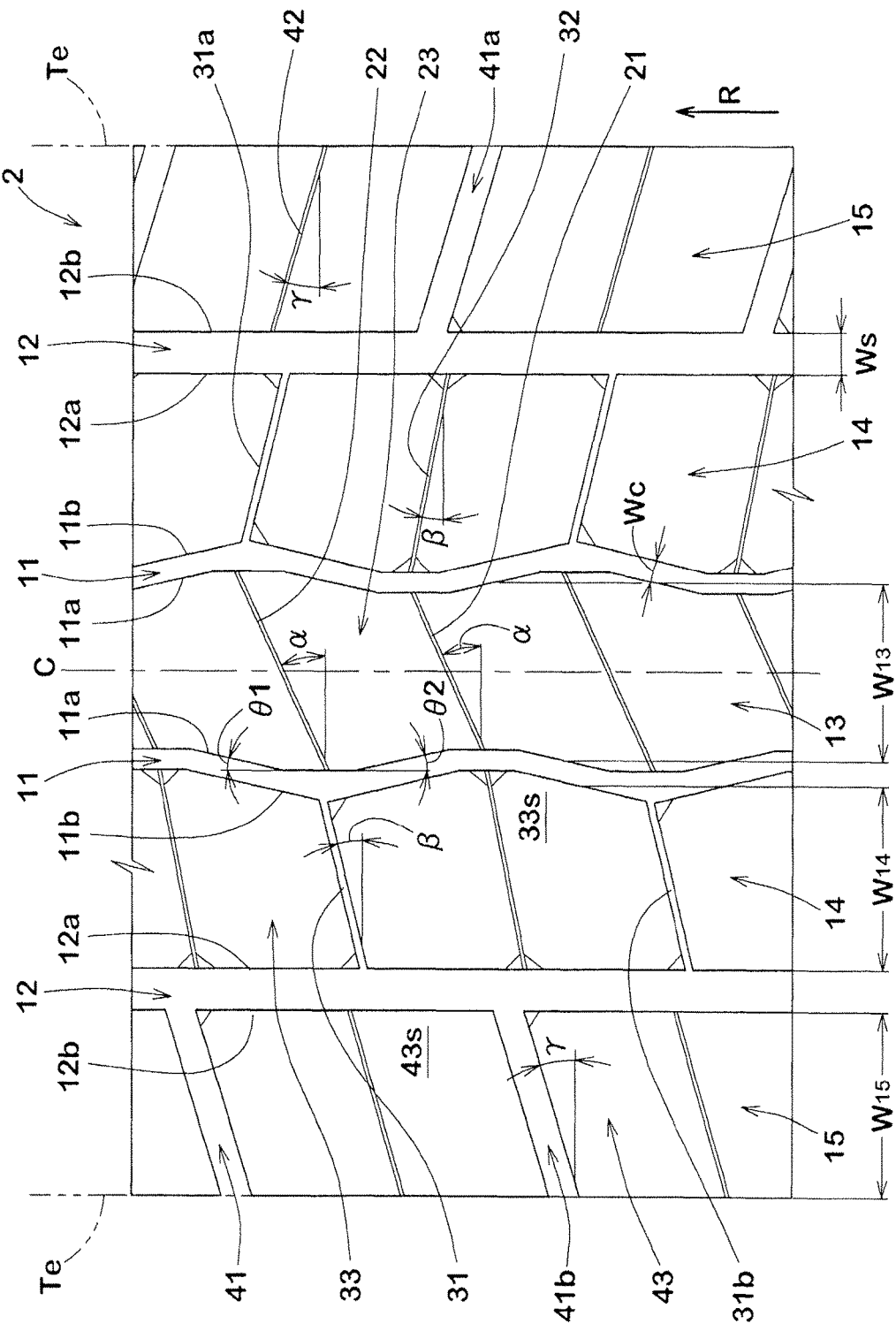
FIG. 2 is a development view of a tread portion shown in FIG. 1.

FIG. 2 is a development view of the tread portion 2 of the heavy duty tire 1 of the present embodiment. As shown in FIG. 2, the heavy duty tire 1 of the present embodiment is provided in the tread portion 2 with a directional pattern where a rotational direction R of the tire is specified.

The tread portion 2 comprises a pair of center main grooves 11 disposed on both sides of the tire equator C and a pair of shoulder main grooves 12. The center main grooves 11 extend continuously in a zigzag shape in the tire circumferential direction. The shoulder main grooves 12 extends continuously linearly in the tire circumferential direction on an axially outside of the center main groove 11 and on an axially inside of the tread ground contact edge Te.

The tread ground contact edge Te means the axially outmost ground end of the tire under the normal state and the normal load at a camber angle of 0 degrees plane. The "normal load" is a load determined for each tire by the standard. For example, it is the maximum load ability in the case of JATMA, the maximum value described in a Table "TIRE LOAD LIMITS AT VARIOUS COLD INFLATION PRESSURES" in the case of TRA, and the "LOAD CAPACITY" in the case of ETRTO.

In the heavy duty tire 1 of the present embodiment, the center main groove 11 having the zigzag shape secures an axial edge component of the center main groove 11 and improves the rolling resistance performance. Furthermore, in the heavy duty tire 1 the drainage performance of the tread portion 2 is enhanced by the linear shoulder main grooves 12, thereby improving the wet performance.

Angles θ1 and θ2 of zigzags to the tire circumferential direction of the center main groove 11 are, for example, preferably not less than 10 degrees and preferably not more than 15 degrees, and more preferably not more than 12.5 degrees. If the angles θ1 and θ2 are less than 10 degrees, the tire axial edge component of the center main groove 11 runs out, and brake performance and traction performance on a wet road surface may be reduced. On the other hand, the angles θ1 and θ2 exceed 15 degrees, the drainage performance of the center main groove 11 may decrease.

The center main groove 11 on a first side of the tire equator C is arranged in circumferentially shifting of zigzag phase with the center main groove 11 on a second side of the tire equator C.

The center main groove 11 comprises a first groove edge 11a on a side of the tire equator C, i.e. on an axially inner side, and a second groove edge 11b on a side of the tread ground contact edge Te, i.e. on an axially outer side. The shoulder main groove 12 comprises a third groove edge 12a on the side of the tire equator C and a fourth groove edge 12b on the side of the tread ground contact edge Te.

Figure 3:
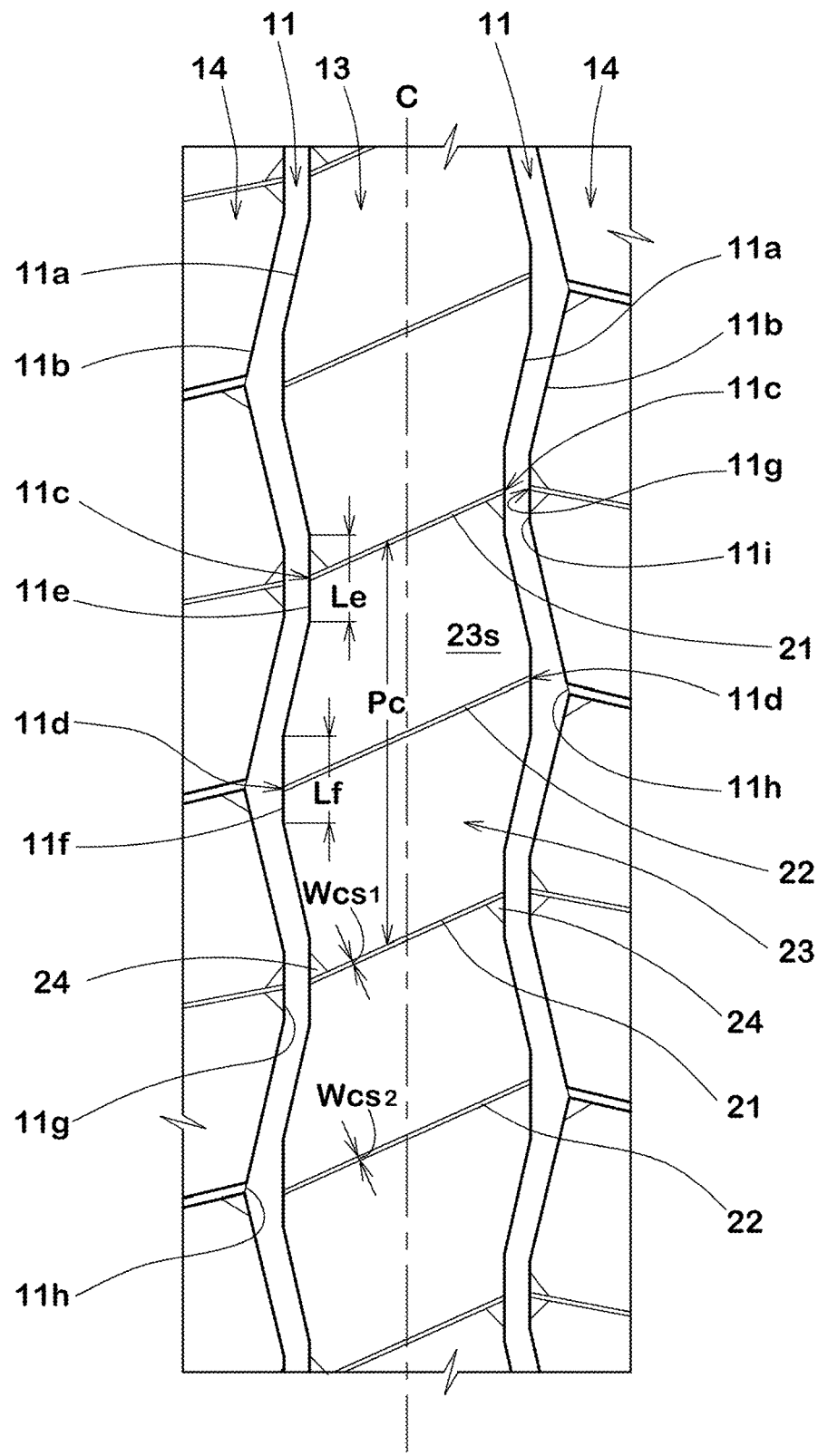
FIG. 3 is an enlarged development view of a crown land portion shown in FIG. 2.

FIG. 3 is an enlarged view of a vicinity of tire equator C of the tread portion 2 including the pair of center main grooves 11. The first groove edge 11a of the center main groove 11 comprises an inner top portion 11c protruding axially most inward and an outer top portion 11d protruding axially most outward. The inner top portion 11c of the present embodiment is formed of a longitudinal edge 11e extending in the tire circumferential direction. The outer top portion 11d is formed of a longitudinal edge 11f extending in the tire circumferential direction. That is, the inner top portion 11c and the outer top portion 11d are formed of a region being continuous in the tire circumferential direction of the first groove edges 11a. The longitudinal edge 11e and the longitudinal edge 11f may be omitted. In this case, a zigzag vertex of the first groove edge 11a is the inner top portion 11c or the outer top portion 11d.

The second groove edge 11b of the center main groove 11 comprises an inner top portion 11g protruding axially most inward and an outer top portion 11h protruding axially most outward. The inner top portion 11g of the present embodiment is formed of a longitudinal edge 11i extending in the tire circumferential direction. That is, the inner top portion 11g is formed of a region being continuous in the tire circumferential direction of the second groove edges 11b. The longitudinal edge 11i may be omitted. In this case, a zigzag vertex protruding toward the tire equator C of the first groove edge 11b is the inner top portion 11g. Owing to the longitudinal edges 11e, 11f and 11i, water is easily discharged in the circumferential direction of the tire, and the drainage performance of the tread portion 2 is increased.

As shown in FIG. 2, the groove width Ws of the shoulder main grooves 12 is preferably larger than the groove width Wc of the center main groove 11. If the groove width Wc of the center main groove 11 is larger than the groove width Ws of the shoulder main grooves 12, the rigidity of the tread portion 2 is insufficient in the vicinity of the tire equator c having a high ground pressure; therefore rolling resistance performance is likely to be worse.

A ratio Ws/Wc between the groove width Ws of the shoulder main grooves 12 and the groove width Wc of the center main groove 11 is, for example, preferably from 1.5 to 2.0. If the ratio Ws/Wc is less than 1.5, the drainage performance in a peripheral portion of the shoulder main groove 12 may be decreased. On the other hand, if the ratio Ws/Wc exceeds 2.0, the rigidity of the peripheral portion of the shoulder main groove 12 is decreased, and the deformation of the tread portion 2 is increased, therefore the rolling resistance performance may be deteriorated. A groove depth of the shoulder main groove 12 is equal to a groove depth of the center main groove 11, for example.

The tread portion 2 is divided into a plurality of land regions by the pair of center main grooves 11 and the pair of shoulder main grooves 12. More specifically, the tread portion 2 is divided into regions: a center land portion 13, a pair of middle land portions 14, and a pair of shoulder land portion 15. The center land portion 13 is disposed between the center main groove 11 on the first side and the center main groove 11 on the second side of the tire equator C. The middle land portion 14 is disposed between the center main groove 11 and the shoulder main groove 12. The shoulder land portion 15 is disposed on an axial outside of the shoulder main groove 12. That is, on both sides of the center main groove 11, the center land portion 13 and the middle land portion 14 are provided. On both sides of the shoulder main groove 12, the middle land portion 14 and the shoulder land portion 15 are provided.

A ratio W13:W14:W15 of an axial average width W13 of the center land portion 13, an axial average width W14 of the middle land portion 14, and an axial width W15 of the shoulder land portion 15 is preferably 1.00:from 1.00 to 1.08:from 1.03 to 1.13, for example. If a ratio W14/W13 is less than 1.00 and if a ratio W15/W13 is less than 1.08, the ground contact pressure of the center land portion 13 is excessively high, and there is a possibility that uneven wear is generated in the center land portion 13. On the other hand, the ratio W14/W13 exceeds 1.03 and if the ratio W15/W13 exceeds 1.13, the ground contact pressures of the middle land portion 14 and the shoulder land portion 15 are excessively high, therefore it is difficult to reduce in rolling resistance.

As shown in FIG. 3, the center land portion 13 comprises a plurality of first center inclined sipes 21 and a plurality of second center inclined sipes 22. Each of the first center inclined sipes 21 and the second center inclined sipes 22 extends at an angle with respect to the tire axial direction, and communicates between the center main groove 11 on the first side of the tire equator C and the center main groove 11 on the second side of the tire equator C. In this embodiment, the center land portion 13 does not comprise any lateral grooves nor inclined grooves communicating between the center main groove 11 on the first side of the tire equator C and the center main groove 11 on the second side of the tire equator C. This center land portion 13 has a high rigidity in the tire circumferential direction, which contributes to improvement in rolling resistance performance.

Each of the first center inclined sipes 21 communicates between the inner top portion 11c of the first groove edge 11a on the first side and the inner top portion 11c of the first groove edge 11a on the second side of the tire equator C. The center land portion 13, which is divided by the pair of the center main grooves 11 arranged in circumferentially shifting of zigzag phase and the first center inclined sipes 21, has a substantially hexagonal barrel-shape. In the center land portion 13 divided to have such a substantially hexagonal barrel-shape, the rigidity of near-field region of its outer top portion 11d is high, and the deformation of this region at the time of grounding is suppressed.

Each of the second center inclined sipes 22 communicates between the outer top portion 11d of the first groove edge 11a on the first side and the outer top portion 11d of the first groove edge 11a on the second side of the tire equator C. The center land portion 13 is a block row in which a plurality of center blocks 23 divided by the first center inclined sipes 21 and the second center inclined sipes 22 are arranged.

A ratio Le/Pc between a tire circumferential length Le of the longitudinal edge 11e and a distance Pc between the circumferentially adjacent first center inclined sipes 21 and 21 is preferably from 0.1 to 0.4, for example. If the ratio Le/Pc is less than 0.1, the rigidity of the inner top portion 11c of the center block 23 is locally lowered, and the inner top portion 11c tends to be a starting point of uneven wear. If the ratio Le/Pc exceeds 0.4, the overall rigidity of the center block 23 is lowered, and it is difficult to reduce the rolling resistance of the tire.

In the same way, a ratio Lf/Pc between a tire circumferential length Lf of the longitudinal edge 11f and a distance Pc between the circumferentially adjacent first center inclined sipes 21 and 21 is also preferably from 0.1 to 0.4, for example.

A ratio Wcs1/Pc between a width Wcs1 of the first center inclined sipe 21 and the distance Pc between the first center inclined sipes 21 and 21 adjacent in the tire circumferential direction is preferably not more than 0.02, more preferably not more than 0.01, for example. If the ratio Wcs1/Pc exceeds 0.02, an area where side walls of the adjacent center blocks 23 abut decreases; therefore, it is difficult to obtain an effect in rigidity improvement by supporting the adjacent center blocks 23, that is the side walls of the sipes, each other.

A width Wcs2 of the second center inclined sipe 22 is equivalent to the width Wcs1 of the first center inclined sipe 21. The second center inclined sipe 22 is parallel to the first center inclined sipe 21. Owing to this second center inclined sipe 22, a rigidity distribution of the center block 23 is optimized, and the wet performance of the center land portion 13 is increased.

In the present embodiment, the center main groove 11 on the first side of the tire equator C is arranged in shifting of zigzag phase with respect to the center main groove 11 on the second side of the tire equator C in a circumferential direction. Therefore, the first center inclined sipe 21 and the second center inclined sipe 22 are inclined with respect to the tire axial direction, and the drainage performance of the center land portion 13 is increased.

Each of depths of the first center inclined sipe 21 and the second center inclined sipe 22 is preferably from 50% to 80% of a depth of the center main groove 11, more preferably from 65% to 75%, for example. If the depth of the first center inclined sipe 21 and the like is less than 50% of the depth of the center main groove 11, the high rigidity by the block can be obtained, however, the area where the side walls of the adjacent blocks abut decreases; therefore, it is difficult to obtain the effect in rigidity improvement by supporting the adjacent blocks each other. Thus the rigidity of the entire center land portion 13 decreases and it is difficult to reduce the rolling resistance of the tire. On the other hand, if the depth of the first center inclined sipe 21 and the like exceeds 80% of the depth of the center main groove 11, the rigidity by the block significantly decreases, and it is difficult to reduce the rolling resistance of the tire.

Of the block vertices where the center main grooves 11 and the first center inclined sipes 21 intersect, a sharp vertex is formed of a chamfered portion 24. The chamfer 24 relieves stress concentration at the block vertex and suppresses damage such as chipping. Instead of the chamfered portion 24, a corner rounded portion may be formed.

Figure 4:
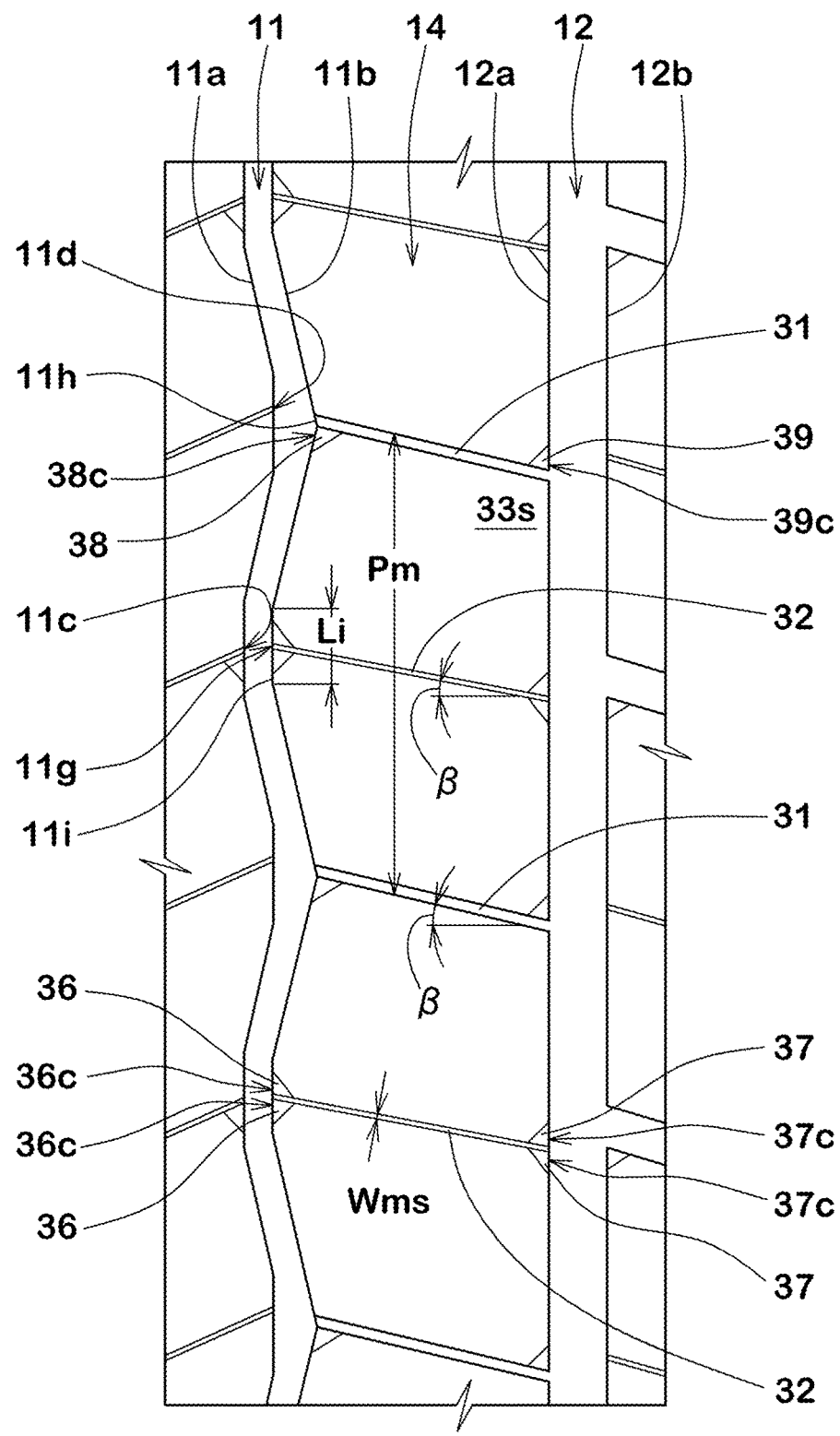
FIG. 4 is an enlarged development view of a middle land portion shown in FIG. 2.

FIG. 4 is an enlarged view of the center main groove 11, the middle land portion 14 and the shoulder main groove 12. The middle land portion 14 comprises a plurality of middle inclined grooves 31 and a plurality of middle inclined sipes 32. Each of the middle inclined grooves 31 and the middle inclined sipes 32 extends at an angle in the tire axial direction and communicates the center main groove 11 and the shoulder main groove 12.

In the middle inclined groove 31, one end thereof communicates with the outside top portion 11h of the second groove edge 11b of the center main groove 11, and the other end thereof communicates with the third groove edge 12a of the shoulder main grooves 12, respectively. Accordingly, the middle land portion 14 is a block row in which a plurality of middle blocks 33 are arranged. Owing to the zigzag center main groove 11, the linear shoulder main groove 12 and the adjacent middle inclined grooves 31 and 31, the tread surface 33s of the middle block 33 of this embodiment has a substantially pentagon.

As shown in FIG. 2, each of the middle inclined grooves 31a on the first side of the tire equator C is inclined in the opposite direction to the middle inclined groove 31b on the second side with respect to the tire axial direction. Thereby, the tread portion 2 comprises a directional pattern having a specified rotational direction R. This directional pattern enhances the drainage performance of the tread portion 2 and improves the wet performance of the heavy duty tire 1.

As shown in FIG. 4, a ratio Li/Pm between a tire circumferential length Li of the longitudinal edge 11i and a distance Pm between the circumferentially adjacent middle inclined grooves 31 and 31 is preferably from 0.1 to 0.4, for example. If the above ratio Li/Pm is less than 0.1, the rigidity of the inner top portion 11g of the middle blocks 33 locally decreases, and the inner top portion 11g likely to be the starting point of the uneven wear. If the ratio Li/Pm exceeds 0.4, it reduces the overall rigidity of the middle block 33 and the reduction in rolling resistance of the tire is difficult.

Each of the middle inclined sipes 32 communicates between the inner top portion 11g of the second groove edge 11b of the center main groove 11 and the third groove edge 12a of the shoulder main grooves 12. The middle inclined sipe 32 is arranged parallel to the middle inclined groove 31 and divides the tread surface 33s of the middle block 33 into two. Owing to this middle inclined sipe 32, the rigidity distribution of the middle block 33 is optimized, and the wet performance of the middle land portion 14 is improved. Furthermore, the middle inclined sipe 32 closes at the time of grounding, and the adjacent sipe side walls attach firmly and support each other, thereby increasing the rigidity of the middle land portion 14. Accordingly, the deformation of the middle land portion 14 is suppressed, and the rolling resistance performance is improved.

As shown in FIG. 2, the first center inclined sipe 21 is formed so as to communicate with the middle inclined sipe 32 through the center main groove 11. Here, the above-mentioned expression that the first center inclined sipe 21 communicates with the middle inclined sipe 32 through the center main groove 11 means that an extended line of the first center inclined sipe 21 and an extended line of the middle inclined sipe 32 intersect one another in the center main groove 11. This arrangement of the first center inclined sipe 21 and the middle inclined sipe 32 improves the wet performance.

As shown in FIG. 4, a ratio Wms/Pm between a width Wms of the middle inclined sipe 32 and a distance Pm between the circumferentially adjacent middle inclined grooves 31 and 31 is preferably not more than 0.02, more preferably not more than 0.01, for example. If the ratio Wms/Pm exceeds 0.02, since the area where the adjacent sipe side walls abut each other decreases, it is difficult to obtain the effect in increase of the rigidity of supporting the middle blocks 33 each other.

The depth of the middle inclined groove 31 is preferably from 10% to 30% of the depth of the center main groove 11, for example. If the depth of the middle inclined groove 31 is less than 10% of the depth of the center main groove 11, there is a possibility that the drainage performance of the middle land portion 14 is reduced. On the other hand, if the depth of the middle inclined groove 31 exceeds 30% of the depth of the center main groove 11, the rigidity of the middle land portion 14 is decreased, and the rolling resistance performance may be deteriorated.

The middle land portion 14 is provided on both ends of the middle inclined sipe 32 with a pair of first chamfered portions 36 and a pair of second chamfered portions 37. Each of first chamfered portions 36 is disposed on a first corner portion 36c sandwiched between the middle inclined sipe 32 and the center main groove 11. The first chamfered portion 36 is lowered from the tread surface 33s of the middle block 33 toward a groove bottom of the center main groove 11. Similarly, each of the second chamfered portions 37 is disposed in a second corner portion 37c sandwiched between the middle inclined sipes 32 and the shoulder main groove 12. The second chamfered portion 37 is lowered from the tread surface 33s of the middle block 33 to the groove bottom of the shoulder main grooves 12. The first chamfered portion 36 and the second chamfered portion 37 alleviates the stress concentration at the apex of the first corner portion 36c and the second corner portion 37c, and the damage such as chipping is suppressed. Instead of the chamfered portions 36 and 37, corner rounding portions may be formed.

The middle land portion 14 is provided on both ends of the middle inclined groove 31 with a third chamfered portion 38 and a fourth chamfered portion 39. The third chamfered portion 38 is disposed on an acute-angled third corner portion 38c sandwiched between the middle inclined groove 31 and the center main groove 11. The third chamfered portion 38 is lowered from the tread surface 33s of the middle block 33 toward the groove bottom of the center main groove 11. Similarly, the fourth chamfered portion 39 is disposed on an acute-angled fourth corner portion 39c sandwiched between the middle inclined grooves 31 and the shoulder main groove 12. The fourth chamfered portion 39 is lowered from the tread surface 33s of the middle block 33 toward the groove bottom of the shoulder main groove 12. These third chamfered portion 38 and fourth chamfered portion 39 alleviate the stress concentration at the vertices of the third corner portion 38c and the fourth corner portion 39c and suppress the damage such as chipping. Instead of the chamfered portions 38 and 39, corner rounding portions may be formed.

Each angle β of the middle inclined groove 31 and the middle inclined sipe 32 with respect to the tire axial direction is preferably from 5 to 20 degrees, for example. If the angle β is less than 5 degrees, there is a possibility that the drainage performance of the middle land portion 14 is decreased. On the other hand, if the angle μ exceeds 20 degrees, there is a possibility that the rigidity of the middle land portion 14 is decreased and that the rolling resistance is increased. The angle of the middle inclined groove 31 with respect to the tire axial direction and the angle of the middle inclined sipe 32 with respect to the tire axial direction may be different one another if within the above-mentioned ranges.

The number of each the middle inclined grooves 31 and the middle inclined sipe 32 provided in a single middle land portion 14 is preferably from 35 to 45, more preferably from 38 to 42, for example. If the number is less than 35, there is a possibility that the drainage performance of the middle land portion 14 is decreased. On the other hand, if the above-mentioned number exceeds 45, the rigidity of the middle land portion 14 is decreased and the reduction in rolling resistance of the tire is difficult.

Figure 5:
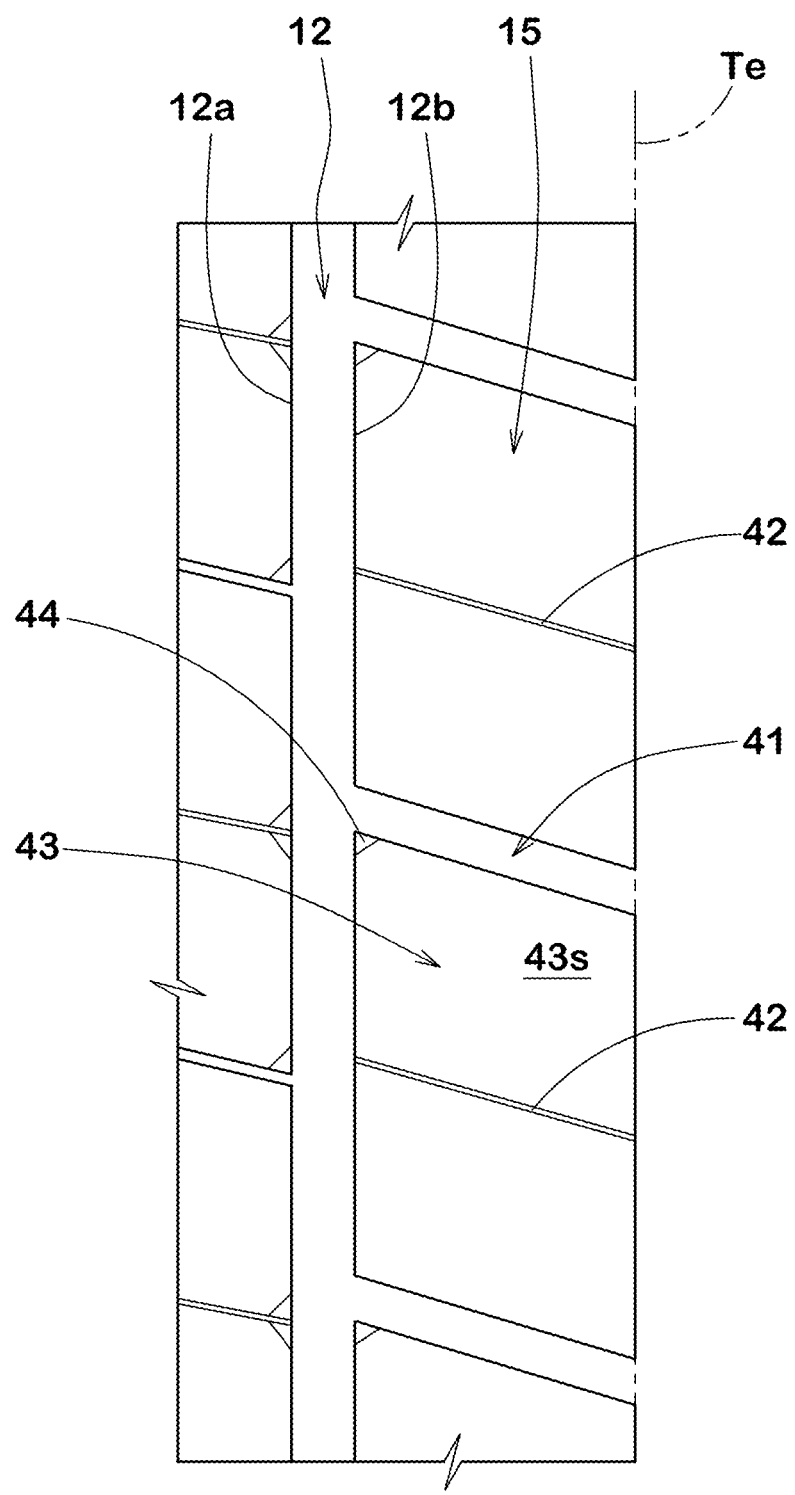
FIG. 5 is an enlarged development view of a shoulder land portion shown in FIG. 2.

FIG. 5 is an enlarged view of the shoulder main groove 12 and the shoulder land portion 15. The shoulder land portion 15 comprises a plurality of shoulder inclined grooves 41 and a plurality of shoulder inclined sipes 42. Each of the shoulder inclined grooves 41 and the shoulder inclined sipes 42 extends at an angle in the tire axial direction and communicates with the shoulder main groove 12 and the tread ground end Te.

In the shoulder inclined groove 41, one end thereof communicates with an fourth groove edge 12b of the shoulder main grooves 12, and the other end thereof communicates with the tread ground contact edge Te, respectively. Accordingly, the shoulder land portion 15 is a block row in which a plurality of shoulder blocks 43 are arranged. Owing to the linear shoulder main grooves 12 and the adjacent shoulder inclined grooves 41, a tread surface 43s of the shoulder block 43 of the present embodiment has a substantially parallelogram.

A depth of the shoulder inclined groove 41 is preferably from 10% to 30% of the depth of the shoulder main groove 12, for example. If the depth of the shoulder inclined groove 41 is less than 10% of the depth of the shoulder main groove 12, there is a possibility that the drainage performance of the shoulder land portion 15 decreases. On the other hand, if the depth of the shoulder inclined groove 41 exceeds 30% of the depth of the shoulder main groove 12, the rigidity of the shoulder land portion 15 is decreased, and the rolling resistance performance may be decreased.

As shown in FIG. 2, each of the shoulder inclined grooves 41a on the first side of the tire equator C is inclined in the same direction with respect to the tire axial direction as the adjacent middle inclined groove 31a across the shoulder main groove 12. The shoulder inclined groove 41b on the second side of the tire equator C is also inclined in the same direction with respect to the tire axial direction as the adjacent middle inclined groove 31b across the shoulder main groove 12. In other words, the shoulder inclined groove 41a on the first side is inclined in the opposite direction with respect to the axial direction to the shoulder inclined groove 41b on the second side. In combination with the above-mentioned middle inclined grooves 31a and 31b, owing to these shoulder inclined groove 41a and 41b, the tread portion 2 comprises the directional pattern has the specified rotational direction R. This directional pattern enhances the drainage performance of the tread portion 2 and improves the wet performance of the heavy duty tire 1.

As shown in FIG. 5, in the shoulder inclined sipe 42, one end thereof communicates with the fourth groove edge 12b of the shoulder main groove 12, and the other end thereof communicates with the tread ground contact edge Te. The shoulder inclined sipe 42 is provided parallel to the shoulder inclined groove 41, thereby dividing the tread surface 43s of the shoulder block 43 in two. Owing to this shoulder inclined sipe 42, the rigidity distribution of the shoulder blocks 43 is optimized, and the wet performance of the shoulder land portion 15 is increased. Furthermore, the shoulder inclined sipe 42 closes at the time of grounding, and the adjacent sipe side walls attach firmly and support each other, thereby improving the rigidity of the shoulder land portion 15. Accordingly, the deformation of the shoulder land portion 15 is suppressed, and the rolling resistance performance is improved.

A depth of the shoulder inclined sipe 42 is preferably from 50% to 80% of the depth of the center main groove 11, for example. If the depth of the shoulder inclined sipe 42 is less than 50% of the depth of the center main groove 11, the high rigidity by the block can be obtained. However, the area where the side walls of the adjacent sipes abut decreases, it is therefore difficult to obtain the effect in rigidity improvement of supporting the blocks each other. Therefore, the rigidity of the entire shoulder land portion 15 is decreased, and it is difficult to reduce the rolling resistance of the tire. On the other hand, if the depth of the shoulder inclined sipe 42 exceeds 80% of the depth of the center main groove 11, the rigidity by the block significantly decreases, and it is difficult to reduce the rolling resistance of the tire.

Of the block vertices where the shoulder main grooves 12 and the shoulder inclined grooves 41 intersect, a sharp vertex comprises a chamfered portion 44. The chamfered portion 44 alleviates the stress concentration at the block vertices and suppresses the damage such as chipping. Instead of the chamfered portion 44, a corner rounded portion may be formed.

In this embodiment, the number of each of the shoulder inclined grooves 41 and the shoulder inclined sipes 42 provided in a single shoulder land portion 15 is the same as the number of each of the middle inclined grooves 31 and the middle inclined sipes 32 provided in a single middle land portion 14. These shoulder inclined grooves 41 and the shoulder inclined sipes 42 reduce the rolling resistance without deteriorating the drainage performance of the shoulder land portion 15.

As shown in FIG. 2, each angle α of the first center inclined sipe 21 and the second center inclined sipe 22 with respect to the tire axial direction is preferably larger than each angle γ of the shoulder inclined groove 41 and the shoulder inclined sipe 42 with respect to the tire axial direction. Owing to these first center inclined sipe 21 and second center inclined sipe 22, the rigidity of the center land portion 13 in the tire circumferential direction is secured, and the reduction of rolling resistance performance is suppressed. In addition, the angle γ is preferably larger than the angle β of each of the middle inclined groove 31 and the middle inclined sipe 32 with respect to the tire axial direction. Owing to these shoulder inclined groove 41 and shoulder inclined sipe 42, the drainage performance of the shoulder land portion 15 is increased, and the wet performance is improved.

A land ratio of the tread portion 2 comprising the above-described pattern is preferably not less than 80%, for example. If the land ratio is less than 80%, due to lack of rubber volume of the tread portion 2, the rigidity of the tread portion 2 decreases, and the rolling resistance performance is deteriorated.

Figure 6:
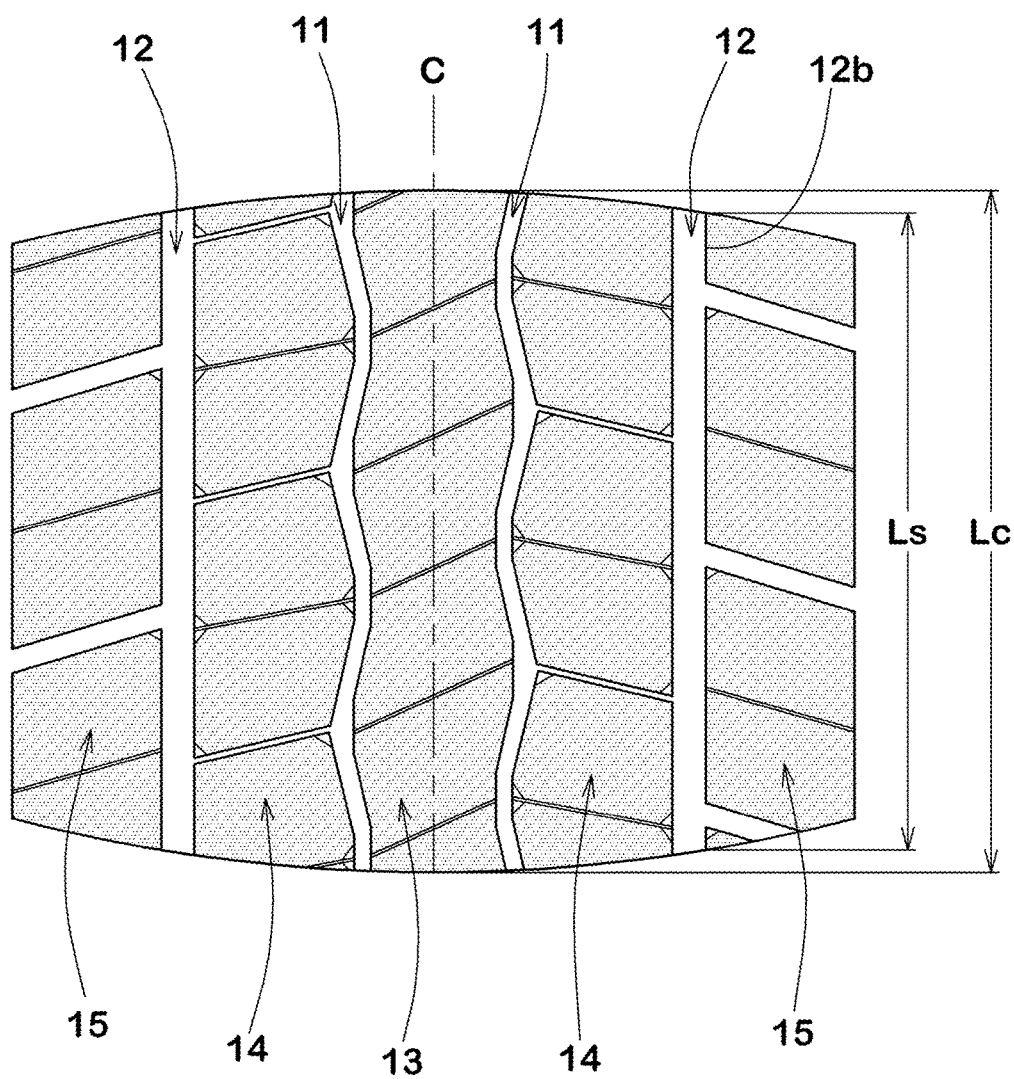
FIG. 6 is a drawing showing a ground contacting shape of the heavy duty tire of FIG. 1.

FIG. 6 shows a grounding shape of the heavy duty tire 1. A ratio Ls/Lc between a ground contact length Ls of the fourth groove edge 12b of the shoulder main groove 12 of the shoulder land portion 15 and a ground contact length Lc of the center land portion 13 in the tire equator C is preferably from 0.9 to 1.0, for example. If the ratio Ls/Lc is less than 0.9, the ground contact pressure of the shoulder land portion 15 is lowered, and uneven wear referred to as shoulder wear occurs. If the ratio Ls/Lc exceeds 1.0, the local slippage occurs in the middle land portion 14 or the like at the time of grounding, and there is a possibility that uneven wear occurs.

According to the heavy duty tire 1 of the present embodiment having the above-described configurations, the shoulder main groove 12 is formed linearly in the tire circumferential direction, and the groove width Ws of the shoulder main groove 12 is larger than the groove width Wc of the center main groove 11. By this shoulder main groove 12, the drainage performance of the tread portion 2 is enhanced thereby improving the wet performance. Further, since the middle inclined groove 31 and the shoulder inclined groove 41, which are inclined with respect to the tire axial direction, are disposed in the middle land portion 14 and the shoulder land portion 15, the drainage from the middle land portion 14 to the tread ground contact edge Te is promoted, thereby improving the wet performance more.

On the other hand, the first center inclined sipe 21 and the second center inclined sipe 22 provided in the center land portion 13 are closed at the time of grounding, therefore the adjacent sipe side walls attach firmly and support each other, thereby increasing the rigidity of the tread portion 2. Accordingly, the deformation of the center land portion 13 having high ground pressure is suppressed, and the rolling resistance performance is improved.

Above, the heavy duty tire of the present invention has been described in detail, but the present invention is implemented by changing the various aspects without being limited to the specific embodiments described above.

Example

Heavy duty tires each having a size of 315/80R22.5 and comprising a tread pattern shown in FIG. 2 were formed based on the specifications shown in Table 1. Each of the tires was mounted on a rim of 22.5×9.00 and tested in rolling resistance performance and wet braking performance. Each of groove depths of the center main groove and the shoulder main groove of the test tire was 16.3 mm. Test methods are as follows.

<Rolling Resistance Performance>

Using a rolling resistance testing machine, each of the test tires was tested in the rolling resistance under the conditions of an internal pressure of 850 kPa, a load of 33.34 kN and a speed of 80 km/h. The result is an index obtained by Example 1 as 100. Higher the numerical value, the smaller the rolling resistance, thereby excelling in fuel economy performance.

<Wet Braking Performance>

Under the conditions of an inner pressure of 595 kPa, a load of 27.63 kN and a speed of 50 km/h, a braking force was applied to a shaft of each of the test tires, and a peak value of a friction coefficient was measured. The result is an index to the value of Example 1 as 100. Higher the numerical value, the better the wet braking performance.

<Uneven Wear Resistance>

The test tires were mounted on the all wheels of a track (2-D vehicle) of the maximum load of 10 ton. The vehicle ran 10000 km in a state of constant load, respective block rows of a center land portion, a middle land portions and a shoulder land portion were observed with naked eyes in presence of uneven wear. The result is an index to the value of Example 1 as 100. Higher the numerical value, the better the uneven wear resistance.

TABLE 1-1

|  | Ex. 1 | Ex. 2 | Ex. 3 | Ex. 4 |
| --- | --- | --- | --- | --- |
| θ1, θ2 (degree) | 10 | 10 | 10 | 10 |
| Shoulder main groove | linearly | linearly | linearly | linearly |
| Ws/Wc | 1.7 | 1.4 | 1.5 | 2 |
| First center inclined sipe | present | present | present | present |
| Second center inclined sipe | present | present | present | present |
| Ls/Lc | 1 | 1 | 1 | 1 |
| Rolling resistance (Index) | 100 | 101 | 100 | 99 |
| Wet braking performance (Index) | 100 | 97 | 99 | 101 |
| Uneven wear resistance (Index) | 100 | 101 | 101 | 99 |

TABLE 1-1-continued

|  | Ex. 5 | Ex. 6 | Ex. 7 | Ex. 8 |
|---|---|---|---|---|
| θ1, θ2 (degree) | 10 | 9 | 12.5 | 15 |
| Shoulder main groove | linearly | linearly | linearly | linearly |
| Ws/Wc | 2.1 | 1.7 | 1.7 | 1.7 |
| First center inclined sipe | present | present | present | present |
| Second center inclined sipe | present | present | present | present |
| Ls/Lc | 1 | 1 | 1 | 1 |
| Rolling resistance (Index) | 98 | 98 | 101 | 101 |
| Wet braking performance (Index) | 101 | 101 | 99 | 98 |
| Uneven wear resistance (Index) | 98 | 101 | 100 | 99 |

TABLE 1-2

|  | Ex. 9 | Ex. 10 | Ex. 11 | Ex. 12 |
|---|---|---|---|---|
| θ1, θ2 (degree) | 16 | 10 | 10 | 10 |
| Shoulder main groove | linearly | linearly | linearly | linearly |
| Ws/Wc | 1.7 | 1.7 | 1.7 | 1.7 |
| First center inclined sipe | present | present | present | present |
| Second center inclined sipe | present | present | present | present |
| Ls/Lc | 1 | 0.85 | 0.9 | 0.95 |
| Rolling resistance (Index) | 102 | 101 | 100 | 100 |
| Wet braking performance (Index) | 97 | 98 | 100 | 100 |
| Uneven wear resistance (Index) | 98 | 97 | 99 | 100 |

|  | Ex. 13 | Com. Ex. 1 | Com. Ex. 2 | Com. Ex. 3 |
|---|---|---|---|---|
| θ1, θ2 (degree) | 10 | 10 | 10 | 10 |
| Shoulder main groove | linearly | zigzag | linearly | linearly |
| Ws/Wc | 1.7 | 1.7 | 0.5 | 1.7 |
| First center inclined sipe | present | present | present | absent |
| Second center inclined sipe | present | present | present | absent |
| Ls/Lc | 1.05 | 0.95 | 0.95 | 0.95 |
| Rolling resistance (Index) | 99 | 100 | 95 | 100 |
| Wet braking performance (Index) | 100 | 96 | 102 | 94 |
| Uneven wear resistance (Index) | 97 | 98 | 96 | 100 |

As is evident from Table 1, compared with comparative Examples, it was confirmed that the heavy duty tires of Examples enhanced the wet performance and the uneven wear resistance while the rolling resistance performance was significantly improved.

DESCRIPTION OF THE REFERENCE NUMERALS

1 Heavy duty tire
2 Tread portion
11 Center main groove
11c Inner top portion
11d outer top portion
11g Inner top portion
11h outer top portion
12 Shoulder main groove
13 Center land portion
14 Middle land portion
15 Shoulder land portion
21 First center inclined sipe
22 second center inclined sipe
31 Middle inclined groove
32 Middle inclined sipe
36 First chamfered portion
36c First corner portion
37 Second chamfered portion
37c second corner portion
41 Shoulder inclined groove
42 Shoulder inclined sipe

The invention claimed is:

1. A heavy duty tire comprising, in a tread portion,
a pair of center main grooves disposed on both axially outer sides of the tire equator and extending continuously in a zigzag shape in the tire circumferential direction, and a pair of shoulder main grooves each disposed on the axially outer side of one of the center main grooves, respectively, and extending continuously linearly in the tire circumferential direction, and thereby dividing the tread portion into a center land portion between the pair of center main grooves, a pair of middle land portions each disposed between one of the center main grooves and its adjacent shoulder main groove, respectively, and a pair of shoulder land portions each disposed axially outside of each of the respective shoulder main grooves;
wherein a groove width (Ws) of each of the shoulder main grooves is larger than a groove width (Wc) of each of the center main grooves,
each of the middle land portions is provided with a plurality of middle inclined grooves each extending at an angle with respect to the tire axial direction and each communicating between an axially outer top portion of the adjacent center main groove and adjacent shoulder main groove,
each of the shoulder land portions is provided with a plurality of shoulder inclined grooves each extending at an angle with respect to the tire axial direction and each communicating between the adjacent shoulder main groove and an adjacent tread grounding edge, each of the shoulder inclined grooves having a groove width that is larger than a groove width of each of the middle inclined grooves,
the center land portion comprises a first center inclined sipe extending at an angle with respect to the tire axial direction and communicating between axially inner top portions of the center main grooves, and a second center inclined sipe extending in the same direction as the first center inclined sipe and communicating between axially outer top portions of the center main grooves, and
each first center inclined sipe angle and each second center inclined sipe angle with respect to the tire axial direction is larger than each middle inclined groove angle and each shoulder inclined groove angle with respect to the tire axial direction.

2. The heavy duty tire according to claim 1, wherein the middle inclined grooves on a first side of the tire equator are inclined in a direction opposite to an inclination direction of the middle inclined grooves on a second side of the tire equator.

3. The heavy duty tire according to claim 1, wherein the shoulder inclined grooves on a first side of the tire equator are inclined in a direction opposite to an inclination direction of the shoulder inclined grooves on a second side of the tire equator.

4. The heavy duty tire according to claim 1, wherein
disposed between each pair of circumferentially adjacent middle inclined grooves is a middle inclined sipe extending parallel to the middle inclined grooves, and
disposed between each pair of circumferentially adjacent shoulder inclined grooves is a shoulder inclined sipe extending parallel to the shoulder inclined grooves.

5. The heavy duty tire according to claim 4, wherein
the middle inclined sipes communicate between the center main grooves and adjacent shoulder main grooves,
each of the middle land portions is provided on a first corner portion sandwiched between each of the middle inclined sipes and adjacent center main grooves with a first chamfered portion having a depth descending toward an adjacent center main groove, and is provided on a second corner portion sandwiched between each of the middle inclined sipes and adjacent shoulder main groove with a second chamfered portion having a depth descending toward an adjacent shoulder main groove.

6. The heavy duty tire according to claim 4, wherein the first center inclined sipe is formed to be continuous with the middle inclined sipe via the respective center main groove.

7. The heavy duty tire according to claim 1, wherein a land ratio of the tread portion is not less than 80%.

8. The heavy duty tire according to claim 1, wherein a ratio (Ws/Wc) between the groove width (Ws) of each of the shoulder main grooves and the groove width (Wc) of each of the center main grooves is from 1.5 to 2.0.

9. The heavy duty tire according to claim 1, wherein each segment of each of the center main groove zigzags has an angle of from 10 to 15 degrees with respect to the tire circumferential direction.

10. The heavy duty tire according to claim 1, wherein a ratio (Ls/Lc) between a ground contact length (Ls) of a groove edge of the shoulder main groove of one of the shoulder land portions and a ground contact length (Lc) in the tire equator is from 0.9 to 1.0.

* * * * *